Patented Mar. 18, 1947

2,417,515

UNITED STATES PATENT OFFICE 2,417,515

NONCONGEALING STARCH PRODUCT AND THE LIKE AND INHIBITOR THEREFOR, AND THE METHOD FOR PREPARING THE INHIBITOR

Henry T. Neumann, New York, N. Y.

No Drawing. Application November 6, 1940, Serial No. 364,470

8 Claims. (Cl. 252—311)

This invention relates to a non-congealing starch product and the like, and to a method and means for preparing the same.

Colloidal starch and similar substances, such as gelatin and gums, find a wide commercial use in many fields. However, these substances have been difficult to handle, since they congeal at room temperature and special methods and apparatus have been employed to prevent their transformation from a colloidal to a congealed state. Thus, in present day practice a starch solution which is prepared by cooking starch with water must be maintained in heated condition during use. If such colloidal starch solution is permitted to cool, it will rapidly revert to a congealed state wherein it is extremely difficult to add a fluid, such as water, to reduce the congealed starch to a watery or semi-watery condition.

Treatment of a colloidal starch solution with nitric acid followed by neutralization has been resorted to for preparing a non-congealing starch solution. It has also been proposed to chlorinate a colloidal starch solution to produce a non-congealing colloidal starch. However, in both of these methods the resulting product has largely consisted of water and was therefore both bulky and expensive to transport from the point of manufacture to the consumer.

Accordingly, one of the objects of my invention is to provide a dry compound which may be added to a mixture of water and starch, gelatin, gum, or the like, to prevent the solution from passing from a colloidal to a congealed state.

Another object of my invention is to produce a starch, gelatin, gum or like colloidal product which may be readily thinned out by the addition of water to control its viscosity; which will not lump during or after preparation; which, upon standing, will maintain a substantially constant viscosity; which can be boiled for long periods of time without thinning; which will not putrify or become mouldy; which may have its pH varied without affecting its other desirable properties; and which can be prepared in a receptacle disposed directly over a high temperature source of heat without the interposition of any temperature control means.

Other objects of my invention are concerned with the provision of a colloidal starch product which will produce a highly satisfactory finish on starched fabrics. My colloidal solution will readily enter a fabric and its viscosity may be quickly and readily changed to create the proper viscosity best suited for any particular fabric. The starch before and after ironing is evenly distributed throughout the fabric, thereby enabling the preparation of an evenly finished surface having no glossy spots. Upon ironing, the starch does not become friable and will not, therefore, during wear throw off a fine powder. Moreover, a fabric starched with my solution has only a slight tendency to absorb moisture.

An additional object of my invention is to provide a dry compound of the character described which will give consistently satisfactory results and which shall be economical to manufacture and simple to use in making a non-congealing colloidal product of starch, gelatin, gum, and like substances.

Still another object of my invention is to provide a colloidal starch, gelatin, gum, or like product, which shall be highly efficient and practical in use.

Other objects of this invention will in part be obvious and in part hereinafter pointed out.

In accordance with my invention, I prepare a dry crystalline compound by dissolving in water the following compounds:

(1) A compound including a carboxyl radical, such as for example sodium acetate, palmitic acid or stearic acid;

(2) An alcohol which has a pH of about 6 such as for example phenol or chrysillic acid. In lieu of these substances, I may employ two compounds, to wit: an alcohol, as for example one of the methane group —ethyl alcohol—, and an acid which has a pH reaction of about 6. For this latter there may be used acetic acid, tartaric acid, furoic acid, or citric acid.

(3) Hexamethylenetetramine.

After these compounds have been dissolved in water, their reaction product is crystallized from the solution and used in the manner hereinafter described.

By way of illustration and without limiting myself to this particular form of my invention, the following illustrates one method of preparing such dry crystalline compound:

A solution of four grams of sodium acetate ($NaC_2H_3O_2.3H_2O$) and two grams of hexamethylenetetramine (($CH_2$)$_6NH_4$) in twenty grams of water is prepared. To this solution I add a solution comprising five grams of carbolic acid ($C_6H_5OH$) and ten cc. of water. The solutions are mixed and heated until all the ingredients have been dissolved. A crystalline composition is then precipitated from the liquor by cooling. This composition is finally separated from the liquor and dried. The dry compound may be mixed with starch either before, during or after the addition of the starch to water, in proportions of approximately one part of the dry compound to ten parts of starch.

One method of carrying out the addition of the dry compound to starch is as follows:

Five grams of starch and 0.5 gram of the dry compound are added to one hundred cc. of cold water and the mixture then stirred and heated directly over a flame. More or less of the dry compound may be employed, depending upon the degree of non-congealability desired to be imparted to the starch and on the conditions under which the starch is to be employed.

During the heating step above described in the preparation of the colloidal starch product, no lumps whatsoever are formed. Also, when a temperature of 168° F. is reached, the liquid mixture remains thin and may be easily stirred, although ordinary starch thickens at this temperature.

The mixture of starch, dry compound and water is brought to a boil at 212° F. My starch solution, when boiled at this temperature, does not thin out, but gradually becomes more viscous and the boiling may be continued until a high degree of viscosity is reached, such as that which is normally obtained in the preparation of starch solutions. The solution is then allowed to cool. During this cooling process it does not congeal. Water may be added to the starch solution during or after cooling to obtain any desired degree of viscosity best suited to the use to which the starch is to be put.

My novel starch product may also be prepared by first heating the mixture of starch, water and dry compound in a double boiler to approximately 190° F. and then removing the receptacle containing the mixture and placing it directly over a flame.

I have found that the viscosity of a colloidal starch solution prepared in accordance with my invention may be increased by simply adding dry powdered starch to a cool colloidal solution, prepared in the above described manner. This starch should, of course, be thoroughly wetted down before addition to the colloidal solution. The added starch is apparently digested at room temperatures and goes into complete solution with the colloidal starch to form a homogeneous mass from which it will not settle out as it would if added to water alone or to a colloidal starch solution, such as heretofore employed. In this manner, the addition of extra starch to raise the viscosity of the colloidal solution will not result in the formation of glossy spots or powdering, such as are caused by the presence of undissolved starch particles.

I have also found that a colloidal starch solution prepared in accordance with my invention will be quickly and uniformly absorbed into fabrics, so that after ironing a uniformly finished surface will be presented. It should also be noted that this ironed starch is very coherent and does not throw off the fine powder ordinarily found in starched garments. Moreover, in contrast to the comparatively deliquescent nature of present day starched garments, which causes them to become dusty, dirty and limp, my starched product after ironing is additionally characterized by the fact that it does not absorb atmospheric moisture to a deleterious degree.

The dry compound may also be added to gelatin to render the colloidal gelatin solutions non-congealing. The following is an example of this use: 5 grams of gelatin is added to 100 cc. of water and the mixture allowed to stand until the gelatin is completely swollen. I then add one (1) gram of the dry compound. The receptacle containing the mixture is next placed directly over a flame and allowed to boil until the gelatin is completely dissolved. It is then removed and allowed to cool. As in the case of the starch solution, water may be added either after or during the cooling period to obtain the desired viscosity. This gelatin solution, I have found, will not congeal no matter how long it is allowed to stand. Various types of gelatin require varying amounts of the dry powder to prevent congealing during cooling, depending upon the congealing capacity of the gelatin. I have found that this colloidal gelatin solution is adaptable for use in textile printing and is characterized by its ability to fix the color of the fabric and to permit clean edging and brilliant coloration. The use of such colloidal gelatin solution also allows the treated fabrics to be steamed, thus avoiding the difficulty presently caused by spilling over of the gums generally employed in textile printing.

The starch and gelatin colloidal solutions prepared in accordance with my invention are also peculiarly adapted for use in the preparation of paper, as they serve to better bind the fibres and produce a paper uniformly sized to any predetermined degree and which can be made to vary its absorption of printing ink, to thus make for economy in the use of the latter. My colloidal solutions may advantageously be employed for commercial purposes, since it may be handled cold and thus does away with the heat now required to maintain the solutions in a colloidal state, as well as with the possible congealing of such solutions if the heat control should be relaxed.

The use of carbolic acid and the employment of relatively long periods of boiling at high temperatures (212° F.) destroys any bacteria present in the colloidal solutions and renders the same immune to putrefaction or mould attack. If, however, this antiseptic feature is not desired, the excess carbolic acid may be removed from the dry compound by mixing said compound with an alcohol, such as for example methyl or ethyl alcohol, which will dissolve out the carbolic acid. The residue is then dried and may be employed by adding same to dry starch, gelatin, gum and like substances in the manner hereinabove described. If desired, the phenol may be reclaimed from the alcohol solution by distillation.

The dry powder may be employed with gum, such as for example gum arabic or gum tragacanth, by adding 0.5 gram of the dry compound to 5 grams of the gum, thoroughly mixing the same with one hundred cc. of water and then boiling. The resultant gum product has a much finer texture than the present day gum and will resist mould, putrescence and insect attacks.

The dry compound prepared in the manner above indicated is acid in nature. However, the pH value thereof may be readily varied so as to give an alkaline reaction. For example, five (5) cc. of the aforementioned carbolic acid solution may be added to a solution comprising five (5) grams of hexamethylenetetramine, ten (10) grams of sodium acetate and fifty (50) cc. of water, and two grams of sodium carbonate added to the liquor. The liquor is then heated to allow all the ingredients to dissolve and next cooled. A crystalline powder will thereupon precipitate out. This powder is removed from the liquor and dried in any suitable manner, whereupon it is ready to be used in the same manner as the dry compound hereinbefore described.

It will thus be seen that there is provided a method and means by which the several objects of this invention are achieved, and which are well adapted to meet the conditions of practical use.

As various possible embodiments might be made of the above invention, and as various changes might be made in the embodiments above set forth, it is to be understood that all matter herein set forth is to be interpreted as illustrative and not in a limiting sense.

Having thus described my invention, I claim as new and desire to secure by Letters Patent:

1. A dry colloid congealing inhibitor comprising the reaction product precipitated from an aqueous solution containing as essential ingredients phenol, sodium acetate and hexamethylenetetramine in the ratio by weight of 5:4:2.

2. A dry crystalline water-soluble colloid congealing inhibitor for preventing congealing of colloids of colloid forming substances from the class consisting of starch, gelatin and gum, which colloids normally congeal at room temperature, said inhibitor being chemically unreactive with said colloids and comprising the reaction product precipitated from an aqueous solution containing as essential ingredients phenol, an alkali metal acetate, an alkali metal carbonate, and hexamethylenetetramine.

3. In combination a colloid forming substance from the class consisting of starch, gelatin and gum, the colloids of which normally congeal at room temperature, and a dry crystalline water-soluble colloid congealing inhibitor for preventing congealing of the colloid of said substance, said inhibitor being chemically unreactive with said colloid and comprising the reaction product precipitated from an aqueous solution containing as essential ingredients phenol, an alkaline metal acetate, an alkaline metal carbonate, and hexamethylenetetramine.

4. A dry crystalline water-soluble colloid congealing inhibitor for preventing congealing of colloids of colloid forming substances from the class consisting of starch, gelatin and gum, which colloids normally congeal at room temperature, said inhibitor being chemically unreactive with said colloids and comprising the reaction product precipitated from an aqueous solution containing as essential ingredients phenol, sodium acetate, and hexamethylenetetramine.

5. In combination a colloid forming substance from the class consisting of starch, gelatin and gum, the colloids of which normally congeal at room temperature, and a dry crystaline water-soluble colloid congealing inhibitor for preventing congealing of the colloid of said substance, said inhibitor being chemically unreactive with said colloid and comprising the reaction product precipitated from an aqueous solution containing as essential ingredients phenol, sodium acetate, and hexamethlylenetetramine.

6. In combination a colloid forming substance from the class consisting of starch, gelatin and gum, the colloids of which normally congeal at room temperature, and a dry crystalline water-soluble colloid congealing inhibitor for preventing congealing of the colloid of said substance, said inhibitor being chemically unreactive with said colloid and comprising the reaction product precipitated from an aqueous solution containing as essential ingredients phenol, sodium acetate, and hexamethylenetetramine in the ratio by weight of 5:4:2.

7. The method of making a dry crystalline water-soluble colloid congealing inhibitor which prevents congealing of colloid forming substances from the class consisting of starch, gelatin and gum, which colloids normally congeal at room temperature and which inhibitor is chemically unreactive with said colloids, said method comprising dissolving soduim acetate and hexamethylenetetramine in water, adding to the water solution formed a water solution of phenol, heating the mixed solutions and removing the crystalline precipitate which consists of the inhibitor.

8. The method of making a dry crystalline water-soluble colloid congealing inhibitor which prevents congealing of colloid forming substances from the class consisting of starch, gelatin and gum, which colloids normally congeal at room temperature and which inhibitor is chemically unreactive with said colloids, said method comprising dissolving sodium acetate and hexamethylenetetramine in water, adding to the water solution formed a water solution of phenol and precipitating the inhibitor in said solution.

HENRY T. NEUMANN.

REFERENCES CITED

The following references are of record in the file of this patent:

UNITED STATES PATENTS

| Number | Name | Date |
|---|---|---|
| 2,099,765 | Horst | Nov. 23, 1937 |
| 910,524 | Fritsche | Jan. 26, 1909 |
| 1,207,177 | Kantororwicz | Dec. 5, 1916 |
| 2,141,313 | Osgood et al. | Dec. 27, 1938 |
| 2,098,083 | Bowen | Nov. 2, 1937 |
| 1,959,433 | Loetscher | May 22, 1934 |
| 1,961,588 | Jones | June 5, 1934 |
| 2,001,430 | Meigs | May 14, 1935 |
| 1,832,038 | Meigs | Nov. 17, 1931 |
| 1,917,038 | Jones | July 4, 1933 |
| 2,308,185 | Lindsay et al. | Jan. 12, 1943 |

FOREIGN PATENTS

| Number | Country | Date |
|---|---|---|
| 494,927 | British | Nov. 3, 1938 |
| 208,193 | British | Dec. 11, 1923 |
| 414,576 | British | Aug. 9, 1934 |